United States Patent [19]

Dreckmann

[11] Patent Number: 4,512,757
[45] Date of Patent: Apr. 23, 1985

[54] DOUBLE-SEAM BAG-MAKING METHOD AND APPARATUS WITH OFFSET STACKING

[75] Inventor: Karl Dreckmann, Hennef-Altenbödingen, Fed. Rep. of Germany

[73] Assignee: M. Lehmacher & Sohn GmbH Maschinenfabrik, Niederkassel-Mondorf, Fed. Rep. of Germany

[21] Appl. No.: 455,904

[22] Filed: Jan. 6, 1983

[30] Foreign Application Priority Data

Jan. 16, 1982 [DE] Fed. Rep. of Germany ....... 3201170

[51] Int. Cl.$^3$ .............................................. B31B 23/00
[52] U.S. Cl. .................................... 493/194; 156/515; 271/213; 493/204
[58] Field of Search ................................ 493/194–204; 271/207, 213, 281, 286; 156/515, 556, 563

[56] References Cited

U.S. PATENT DOCUMENTS

| | | | |
|---|---|---|---|
| 3,057,527 | 10/1962 | Hannon | 493/198 X |
| 3,868,290 | 2/1975 | Lagain | 493/194 X |
| 4,128,049 | 12/1978 | Lehmacher | 493/194 |
| 4,195,960 | 4/1980 | Schulze | 271/213 X |
| 4,452,597 | 6/1984 | Achelpohl | 493/204 |

Primary Examiner—David Simmons
Attorney, Agent, or Firm—Karl F. Ross; Herbert Dubno

[57] ABSTRACT

An apparatus for making bags from a multilayer synthetic-resin strip workpiece has a transporter for conveying the workpiece longitudinally in a transport direction along a path, an upper vertically displaceable welding element along the path having relative to the direction an upper upstream welding tool extending across the path and generally parallel thereto an upper downstream welding tool, and respective vertically displaceable lower upstream and downstream welding tools vertically aligned with the upper upstream and downstream tools. A blade extends transverse to the path between one of the upstream tools and the respective downstream tool. Displacement together of the tools with a workpiece between them welds the workpiece together along upstream and downstream seams at the respective tools and cuts the workpiece across with the blade between the seams, and away from one another frees the severed downstream end section of the workpiece. A stack support downstream of the tools catches and holds the severed end sections in a stack. This stack support is displaced in the transport direction synchronously with displacement of the tools for offsetting the trailing ends of succeeding severed end sections in the stack. Thus the offset ends of the bag-forming end sections do not lie on each other so they will not fuse together.

12 Claims, 3 Drawing Figures

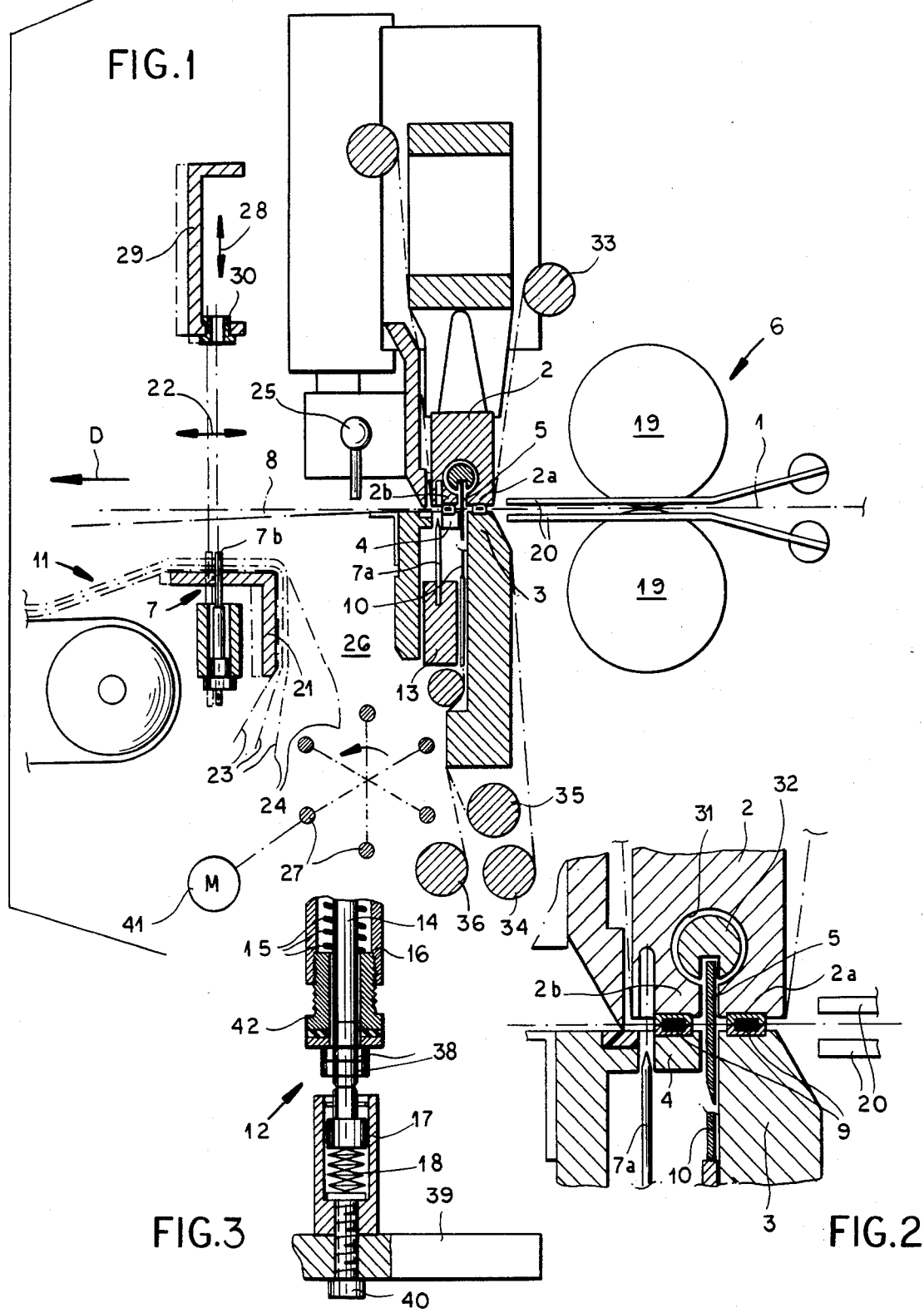

DOUBLE-SEAM BAG-MAKING METHOD AND APPARATUS WITH OFFSET STACKING

FIELD OF THE INVENTION

The present invention relates to the manufacture of a bag from a multilayer thermoplastic workpiece. More particularly this invention concerns an apparatus and method for making a stack of bags from an elongated tube or the like.

BACKGROUND OF THE INVENTION

It is known from German Pat. No. 1,182,414 to make bags from a multilayer thermoplastic strip workpiece, normally of polyethylene, in an apparatus having transport means for conveying the workpiece longitudinally in a transport direction along a path underneath an upper welding element having relative to the direction an upper upstream welding tool extending across the path and generally parallel thereto an upper downstream welding tool. Respective lower upstream and downstream welding tools are vertically aligned with the upper upstream and downstream tools and a blade extends transverse to the path between one of the upstream tools and the respective downstream tool. The upper and lower tools with the workpiece between them are relatively displaced toward one another to weld the workpiece together along upstream and downstream seams at the respective tools and to cut the workpiece across with the blade between the seams, and away from one another to free the severed downstream end section of the workpiece. Stacking means including a stack support downstream of the tools catches and holds the severed end sections in a stack.

A principal difficulty with this system is that the bags stick together at the seams in the stack. This is due to the fact that the seam regions are still quite warm when they are stacked up, and the seam regions are stacked right on top of each other in exact vertical registration so the still-hot seams can coalesce somewhat together. Sometimes the adherence is so great that the bags tear when an attempt is made to separate them.

OBJECTS OF THE INVENTION

It is therefore an object of the present invention to provide an improved method of and apparatus for making bags.

Another object is the provision of such a method of and apparatus for making bags which overcomes the above-given disadvantage, that is which forms a stack of bags that do not stick to one another at the seams.

SUMMARY OF THE INVENTION

These objects are attained according to the instant invention in an apparatus for making bags from a multilayer synthetic-resin strip workpiece which has, as is known, transport means for conveying the workpiece longitudinally in a transport direction along a path, an upper welding element along the path having relative to the direction an upper upstream welding tool extending across the path and generally parallel thereto an upper downstream welding tool, and respective lower upstream and downstream welding tools vertically aligned with the upper upstream and downstream tools. A blade extends transverse to the path between one of the upstream tools and the respective downstream tool and means is provided for relatively vertically displacing the upper and lower tools with the workpiece between them toward one another to weld the workpiece together along upstream and downstream seams at the respective tools and to cut the workpiece across with the blade between the seams, and away from one another to free the severed downstream end section of the workpiece. Stacking means includes a stack support downstream of the tools for catching and holding the severed end sections in a stack. According to this invention, the stack support is displaced in the transport direction synchronously with displacement of the tools for offsetting the trailing ends of succeeding severed end sections in the stack. Thus with this system the offset ends of the bag-forming end sections do not lie on each other so their heat will not add up to be enough to fuse them together.

According to another feature of this invention the support is spaced downstream from the downstream tools and the stacking means includes means including a nozzle above the path between the support and the downstream tools and directed downward into the space therebetween for directing a stream of gas across the path to blow the trailing ends of the severed end sections down into the space. In this manner the bag ends with the fused weld lines do not touch anything until they cool and harden.

This cooling and hardening is enhanced by using a stream of relatively cool gas that simultaneously fans out the workpiece ends and cools the welds.

The stacking means can include in order to separate the hot ends most effectively a rotary drum in the space and rotatable to engage and fan out the upstream ends of the severed end sections.

The stack support accordingly moves in the transport direction. In addition its starting and end positions, as well as the length of its reciprocation stroke, can be reset and varied to make bags of different sizes with different extents of offset in the stack. In addition the position of this support can be adjusted vertically transverse to the transport direction.

DESCRIPTION OF THE DRAWING

The above and other features and advantages will become more readily apparent from the following, reference being made to the accompanying drawing in which:

FIG. 1 is a vertical and partly diagrammatic section illustrating the apparatus according to this invention;

FIG. 2 is a large-scale view of a detail of FIG. 1; and

FIG. 3 is a large-scale view of another detail of the apparatus of this invention.

SPECIFIC DESCRIPTION

As seen in FIG. 1, an apparatus according to this invention serves to transversely weld and longitudinally subdivide a workpiece 1, here a double layer of a thermoplastic foil, film, or sheet intended for the manufacture of bags. To this end the workpiece 1 is a polyethylene tube that is made into bags by forming a transverse bottom seam across and then severing it transversely to longitudinally subdivide it into individual bags with the transverse seam being the bottom of the bag. This operation can be carried out in two manners, either by simultaneously seaming and cutting along three parallel lines with the two seams flanking the cut, a procedure known as double seaming, or by melting through the tube along a line to form two closed and parallel straight end seams, a procedure known as bottom seaming. The description below will first only refer to the structure necessary for double seaming.

The apparatus has an upper welding element 2 formed with a transversely throughgoing upstream tool 2a and with a similar downstream tool 2b. Between the tools 2a and 2b the element 2 is formed as better seen in FIG. 2 with a throughgoing bore 31 that receives a rod 32 fitted with a blade 5 that projects down between and beneath the lower faces of the tools 2a and 2b. A drive 33 is connected to the element 2 to jointly raise and lower the integral tools 2a and 2b.

Underneath the upper tools 2a and 2b the apparatus is provided with independent upstream and downstream lower tools or anvils 3 and 4 provided, like the upper tools 2a and 2b, with strip heaters 9 that allow their faces to be heated. These anvils 3 and 4 can be vertically reciprocated by a drive 34.

The workpiece 1 is fed through the machine in a transport direction D by a feeder 6 comprising a pair of oppositely rotated pinch rollers 19 and a pair of slot nozzles 20 that are directed horizontally downstream above and below the workpiece 1. Thus the wide band-shaped streams of air flowing downstream from these nozzles 20 hold the workpiece 1 in a planar and perfectly horizontal position so that it is possible to orient a downstream section 8 of the workpiece 1 to extend through the space between the upper welding element 2 and lower tools 3 and 4.

Downstream of the welding station formed by the element 2 and tools 3 and 4 is a stacking unit 7 that forms a stack 11 that is delivered to a conveyor 37. Thus unit 7 has two separate stackers, the one of interest here having heated pins 7b projecting up from an angle iron or rail 21 projecting horizontally transverse to the workpiece transport direction downstream of the welding station. Above the workpiece path is a nozzle 25 directed down into a space 26 between the rail 21. In the lower region of this space 26 is a beater drum 27. The angle iron 21 supporting the stack 11 can be reciprocated horizontally as shown by arrow 22 by a drive 41. In addition its position can be changed in the direction D for bags of different sizes, and its vertical position can be adjusted as shown by arrow 28.

The tool 4 is carried as shown in FIG. 3 on a rod 14 surrounded by a tube 16 that supports the tool 3, with springs 15 braced between the rod 14 and tube 16 to urge the tool 4 into a position horizontally level with the tool 3. An adjustment nut 42 screwed into the lower end of the tube 16 supporting the tool 3 establishes the force exerted upward by the spring 15 on the bottom of the tool 4. Lock nuts 38 define the relative position of the tools 3 and 4 relative to each other when the tool 4 is in its uppermost position. For double-seam welding a spring pack 18 is mounted in a cup 17 underneath the lower end of the rod 14 to resist downward displacement of both the tools 3 and 4 with a substantial force. This cup 17 is releasably secured in place on the frame 39 of the device by means of a screw 40.

Thus, for double-seam bag production the heaters 9 are all energized, although only one of the upstream and one of the downstream heaters 9 need be used for very thin film, and the spring abutment unit formed by the cup 17 and springs 18 is positioned under the rod 14. This inhibits the tool 4 from moving down relative to the tool 3, allowing them both only to move limitedly down against considerable spring force.

The downstream end section 8 of the workpiece 1 is positioned by the air blasts from the nozzles 20 to extend horizontally downstream through the gap defined between the upper element 2 and lower tools 3 and 4 in the starting position, in which they are vertically spaced. The upper welding element 2 is then brought down to simultaneously pinch and weld together the workpiece 1 along two parallel lines while the blade 5 severs the downstream section 8 with its newly formed upstream end seam from the workpiece 1.

The upper tool 2 is then lifted so that the freed downstream section 8 moves back in the direction D and down by the respective effects of the nozzles 20 and 25, coming to lie on the bar 21 with the heated pin or pins 7b holding it in place on top of the stack 11. End portions 23 of the cut-off sections or bags 8 thus hang down in the space 26.

Meanwhile according to this invention the support bar 21 is reciprocated back in forth synchronously with the raising of the upper tool 2 so that every other trailing edge 24 will be slightly offset from the edge 24 of the preceding and following section 8. These edges 24 are stroked and fanned out by the rotating beater drum 27 in the space 26 while cool air from the nozzle 25 flows over them. Thus the trailing end portions 23 will be cooled while fanned out by the parallel and angularly equispaced bars of the beater drum 27 so their still-hot welds formed by the downstream tools 2b and 4 do not stick together.

Once the stack 11 is of the desired size the bar 21 and/or at least the pins 7b are lowered so that it can be transported away. For more details of how the stack is picked off the bar 21 reference should be made to my jointly filed and copending application Ser. No. 453,119, filed Dec. 27, 1982.

For bottom-seam operation the device is provided with a heatable rail or blade 10 that can be raised by a drive 36 to a position projecting up between and above the upper faces of the two lower tools or anvils 3 and 4, which is only done when the blade 5 has been removed. In addition for bottom seaming a row of holding needles 7a carried on a bar 13 can be raised by means of a drive 35 to project up through the downstream anvil 4. The apparatus also has, for bottom seaming, another rail 29 formed with holes 30 for the needles 7b and vertically displaceable as indicated also by arrow 28. Complete lowering of this bar 29 therefore puts the stacker of the bar 21 out of use.

As described in more detail in my jointly filed and copending application Ser. No. 455,919, filed Dec. 6, 1982 the heaters 9 are not used for bottom seaming. Instead the workpiece is pinched between the tools 2a and 3 along a line, is melted through along a line immediately downstream therefrom by the bar 10, and is pinched downstream of the melt line between the upper downstream tool 2b and the tool 4 or the stack of severed sections held against it. Downward displacement of the element 4 relative to the tool 2 is possible because the spring pack 18 and its cup 17 are not underneath the rod 14 carrying the tool 4. As the tool 4 moves down the bar 10 acts as a shield to prevent the air stream from the lower nozzle 20 from moving the stacked workpieces 8. The stack thus formed is left spindled on the needle 7a.

Thus the apparatus is provided with stackers particularly adapted to double-seam work and bottom-seam work. The double-seam stacker holds the hot fused weld lines out of contact with each other altogether and out of contact even with other bags until thoroughly cool. The bags will therefore not stick together in the stack. The bottom-seamed bags can simply be stacked up in the illustrated manner in direct vertical registration with one another.

I claim:

1. An apparatus for making bags from a multilayer synthetic-resin strip workpiece, the apparatus comprising:

transport means for conveying the workpiece longitudinally in a transport direction along a path;

an upper welding element along the path having relative to the direction an upper upstream welding tool extending across the path and generally parallel thereto an upper downstream welding tool;

respective lower upstream and downstream welding tools vertically aligned with the upper upstream and downstream tools;

a blade extending transverse to the path between one of the upstream tools and the respective downstream tool;

means for relatively vertically displacing the upper and lower tools with the workpiece between them toward one another to weld the workpiece together along upstream and downstream seams at the respective tools and to cut the workpiece across with the blade between the seams, and away from one another to free the severed downstream end section of the workpiece;

stacking means including a stack support downstream of the tools for catching and holding the severed end sections in a stack; and means for displacing the stack support in the transport direction synchronously with displacement of the tools for offsetting the trailing ends of succeeding severed end sections in the stack.

2. The bag-making apparatus defined in claim 1 wherein the support is spaced downstream from the downstream tools and the stacking means includes means including a nozzle above the path between the support and the downstream tools and directed downward into the space therebetween for directing a stream of gas across the path to blow the trailing ends of the severed end sections down into the space.

3. The bag-making apparatus defined in claim 2 wherein the stream is of a gas cooler than the seams for hardening same.

4. The bag-making apparatus defined in claim 2 wherein the stacking means further includes a rotary drum in the space and rotatable to engage and fan out the upstream ends of the severed end sections.

5. The bag-making apparatus defined in claim 1 wherein the support is movable in the transport direction.

6. The bag-making apparatus defined in claim 1 wherein the support is vertically displaceable transverse to the transport direction.

7. A method of making bags from a multilayer synthetic-resin strip workpiece with an apparatus comprising:

transport means for conveying the workpiece longitudinally in a transport direction along a path;

an upper welding element along the path having relative to the direction an upper upstream welding tool extending across the path and generally parallel thereto an upper downstream welding tool;

respective lower upstream and downstream welding tools vertically aligned with the upper upstream and downstream tools;

a blade extending transverse to the path between one of the upstream tools and the respective downstream tool; and stacking means including a stack support downstream of the tools; the method comprising the steps of:

relatively vertically displacing the upper and lower tools with the workpiece between them toward one another to weld the workpiece together along upstream and downstream seams at the respective tools and to cut the workpiece across with the blade between the seams and, away from one another to free the severed downstream end section of the workpiece;

catching and holding the severed end sections in a stack on the support; and displacing the stack support in the transport direction synchronously with displacement of the tools and thereby offsetting the trailing ends of succeeding severed end sections in the stack.

8. The bag-making method defined in claim 7 wherein the support is spaced downstream from the downstream tools, the method further comprising the step of:

directing a stream of gas downward into the space between the support and the downstream tools to blow the trailing ends of the severed end sections down into the space.

9. The bag-making method defined in claim 8 wherein the stream is of a gas cooler than the seams for hardening same.

10. The bag-making method defined in claim 8, further comprising the step of:

fanning out the upstream ends of the severed end sections in the space.

11. The bag-making method defined in claim 7 wherein the support is movable synchronously with the movement of the tools in the transport direction to alternate between upstream and downstream end positions with succeeding engagements of the upper tools with the lower tools.

12. The bag-making method defined in claim 7, further comprising the step of heating at least one of the upstream welding tools and one of the downstream welding tools to seam the workpiece.

* * * * *